United States Patent [19]

Backus

[11] Patent Number: 4,947,049

[45] Date of Patent: Aug. 7, 1990

[54] FILM HANDLING MEANS FOR A PHOTOGRAPHIC PRINTER

[75] Inventor: Richard J. Backus, Rochester, N.Y.

[73] Assignee: Eastman Kodak Company, Rochester, N.Y.

[21] Appl. No.: 305,830

[22] Filed: Feb. 2, 1989

[51] Int. Cl.⁵ .................. G01N 21/86; G01V 9/04
[52] U.S. Cl. ...................... 250/561; 354/298; 355/75
[58] Field of Search ............ 250/561, 223, 560, 571; 354/297, 298; 353/26 A, 26 R; 355/41, 75

[56] References Cited

U.S. PATENT DOCUMENTS 3,554,107  1/1971  McCarthy et al. ............ 354/298
3,696,981  10/1972  Levy ......................... 250/561
4,200,383  4/1980  Bendoni et al. .............. 354/298

Primary Examiner—David C. Nelms
Assistant Examiner—George C. Beck
Attorney, Agent, or Firm—James A. Smith

[57] ABSTRACT

A photographic printer is provided with a film strip receiving means including an elongated film strip receiving slot. A transport means is activated by a film strip detection means when the leading end of a film strip is inserted into the slot to move the film strip into the slot. The detection means also detects the presence of the trailing end of the film strip if the film strip is not totally contained by the slot. If a trailing end is not detected, a door is closed to light seal the entrance to the slot. If a trailing end is detected, the door is not closed to prevent damage to the film strip.

9 Claims, 4 Drawing Sheets

FILM HANDLING MEANS FOR A PHOTOGRAPHIC PRINTER

CROSS REFERENCE TO RELATED APPLICATIONS AND PATENTS

Reference is made to (1) commonly assigned U.S. Pat. No. 4,774,553 FILM HANDLING MECHANISM issued Sept. 27, 1987 in the names of Douglass L. Blanding, Shaun M. Amos and Thomas C. Jessop; and (2) commonly assigned U.S. application Ser. No. 305832 entitled FILM DETECTION APPARATUS filed concurrently herewith in the names of Robert L. Horton and Richard J. Backus. The disclosure of both the patent and application are incorporated herein by reference.

BACKGROUND OF THE INVENTION

1. Field of the Invention

The present invention relates to a film handling means and more specifically to means for detecting the presence of a film strip in a film receiving location of a photographic printer.

2. Description Relative to the Background Art

Commonly assigned U.S. Pat. No. 4,774,553 discloses a film handling mechanism for a photographic printer which provides for film movement at a gate in all directions in the film plane including rotation. The mechanism includes a guiding means which define a thin elongate rectangular space or slot for receiving a 35 mm film strip containing up to four frames. In use the end of the film strip is inserted by the user and is moved into the slot by belts driven by a motor. After the film strip is received in the slot, a door for enclosing the entrance to the slot is closed to light seal the space.

To control operation of the motor driven belt mechanism and to prevent damage to film strips of abnormal lengths it is desirable to detect both the insertion of the leading end of the film strip by the user and the containment of the entire film strip by the slot. Detection of the leading end is desirable to activate the belt transport mechanism and detection of the complete containment is desirable to warn against or prevent closure of the door if the film strip is not fully contained.

SUMMARY OF THE INVENTION

In accordance with the invention, a film presence detection means is positioned adjacent the entrance to a film strip receiving slot to detect the presence of the film as the user inserts the leading end into the slot. Upon detection of the film, a film transport means is activated to move the film into the slot. The film detection means is positioned exteriorly of the slot so that it will also detect the presence of the trailing end of the film strip outside the slot if the film strip does not become fully contained by the slot. If the film strip is not of abnormal length, the film detection means will issue a door closing signal. Alternatively, if the presence of the trailing end outside the slot is detected, the transport means is activated to eject the film strip.

Another aspect of the invention is its use in combination with the detection means such as disclosed in copending application Ser. No. 305832 filed concurrently herewith in the names of Robert L. Horton and Richard J. Backus and entitled FILM DETECTION APPARATUS. The detection means disclosed in this copending application utilizes a light source which emits light at a wavelength which is substantially absorbed by the film strip. This enables the detecting means to be located outside the slot entrance where extraneous light might exist.

BRIEF DESCRIPTION OF THE DRAWINGS

The invention will be readily understood by reference to the appended drawings, in which.

DETAILED DESCRIPTION OF THE INVENTION

Figure 1:
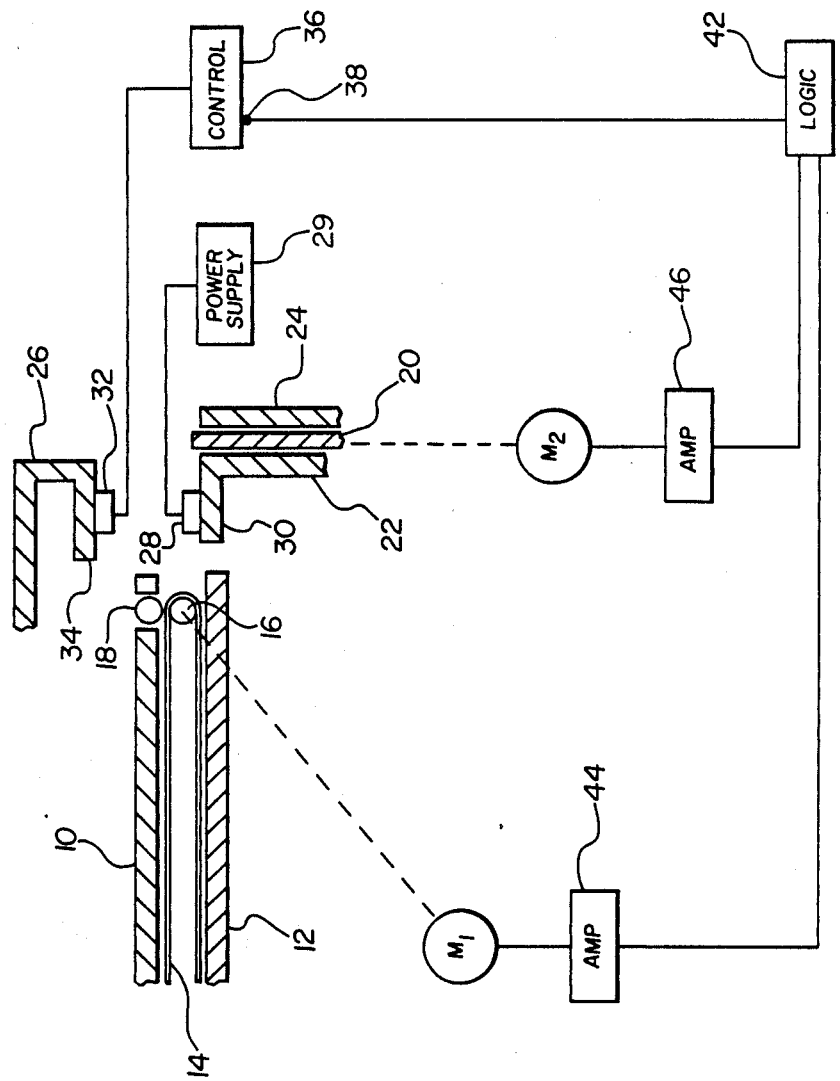
FIG. 1 is a generally schematic illustration of a film handling means in accordance with the present invention.

Referring to FIG. 1 of the drawings, there is shown a film handling means for a photographic printer. The film handling means includes a film strip receiving means comprising a pair of plates 10, 12 between which is mounted a belt 14 driven by a drive roller 16 in turn driven by a reversible motor $M_1$. The belt 14 engages a nip roller 18. A film strip to be printed is inserted manually into the nip between roller 18 and belt 14 whereupon motor $M_1$ is activated as hereinafter described to cause belt 14 to transport the film strip into the film receiving means. Such receiving and transporting apparatus is disclosed in detail in U.S. Pat. No. 4,774,553 incorporated herein by reference, and further description is deemed unnecessary.

Positioned adjacent to the entrance to the film receiving means is an enclosure means including a movable door 20 which is adapted to be raised or lowered by a reversible motor $M_2$. The door 20, shown in its open position in FIG. 1, is slideably mounted between a pair of walls 22 and 24 and engages the outer surface of an upper wall 26 in its closed position. In its closed position, the door 20 will create a light lock to prevent ambient light from entering the entrance to the film strip receiving means.

A film detecting means comprises a light emitting diode 28 coupled to a power supply 29 and mounted on a flange 30 of wall 22. The film detecting means further includes a light sensitive diode 32 mounted on a flange 34 of wall 26 and coupled to a control means 36 which produces an output logic 1 or 0 at terminal 38 depending on the absence or presence of film in the space between diodes 28 and 32.

Figure 4:
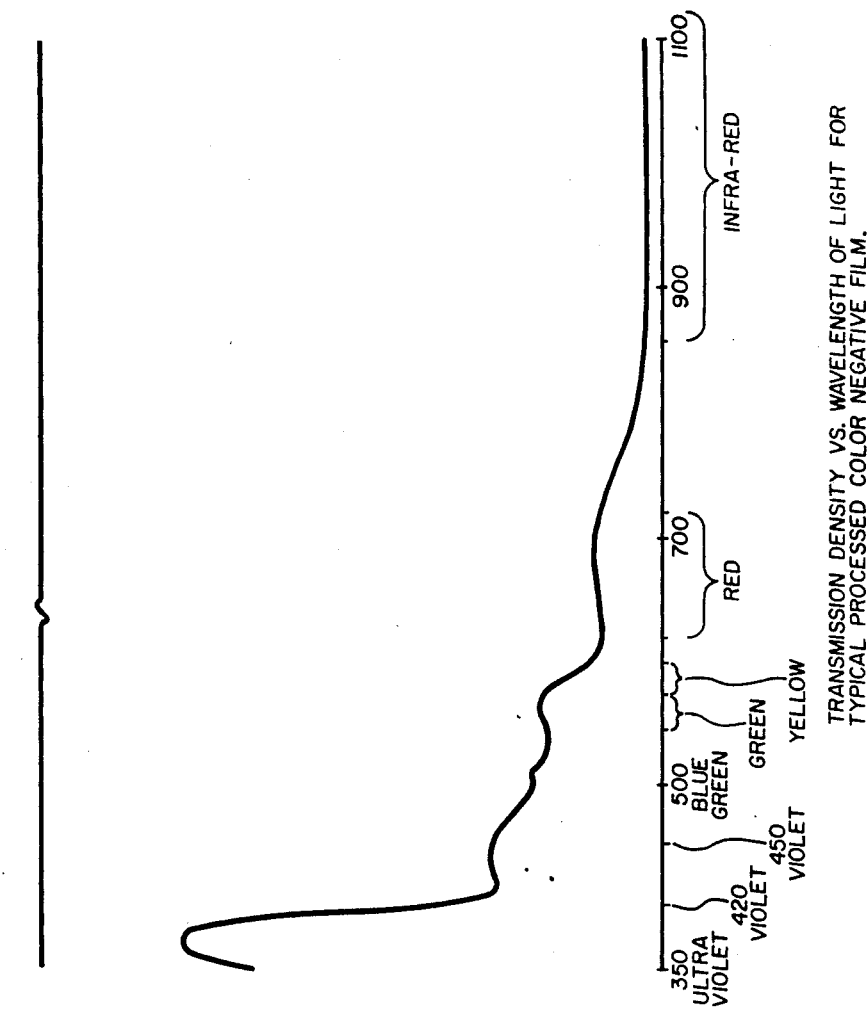
FIG. 4 is a graph of transmission density vs. wavelength for a typical 35 mm color negative film.

The film detecting means preferably takes the form of that disclosed and claimed in copending application Ser. No. 305832 entitled FILM DETECTION APPARATUS filed concurrently herewith in the names of Robert L. Horton and Richard J. Backus. As described in this copending application, the film detecting means employs a light source emitting light in the range of 420-600 nanometers, the range encompassing blue and green light. Since light at these wavelengths is strongly absorbed by the film, the system is less affected by extraneous light. FIG. 4 which is a graph of transmission density vs. wavelength illustrates the transmission density of typical 35 mm color negative film such as the KODACOLOR VR 35 mm films manufactured by Eastman Kodak Company.

Figure 3:
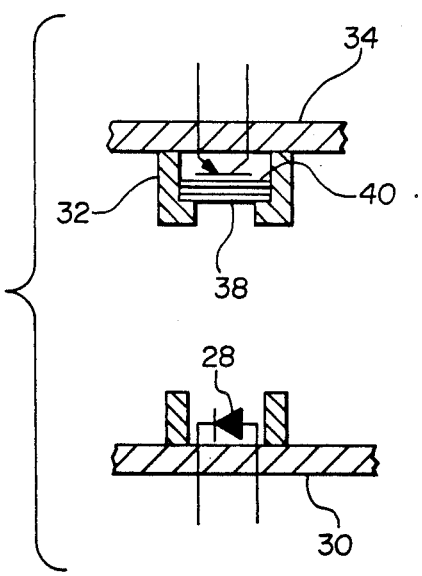
FIG. 3 is a schematic diagram illustrating in more detail the film detection means illustrated in FIG. 1.

Referring to FIG. 3, the light source comprises a light emitting diode 28 preferably selected to emit green light because green light emitting diodes have a lower cost than blue emitting diodes. An infrared absorbing filter 38 and a green light transmitting filter 40 are positioned in front of a light sensitive transistor 32. Preferably, two light emitting diodes would be utilized as disclosed in the aforementioned copending application; however, to simplify the disclosure, only one has been shown in FIG. 3. As described in said copending application, the use of green or blue light provides much more positive detection particularly since the film is unsupported in the area of detection. Non-absorbed light can be reflected if the film through bending or as a result of curl becomes positioned at an angle relative to the detecting means.

To complete the system, the output terminal of control 36 is coupled to logic means 42 which can be provided by a general purpose computer. The logic provides an operating program for selectively energizing amplifiers 44 and 46 for motors $M_1$ and $M_2$.

Figure 2:
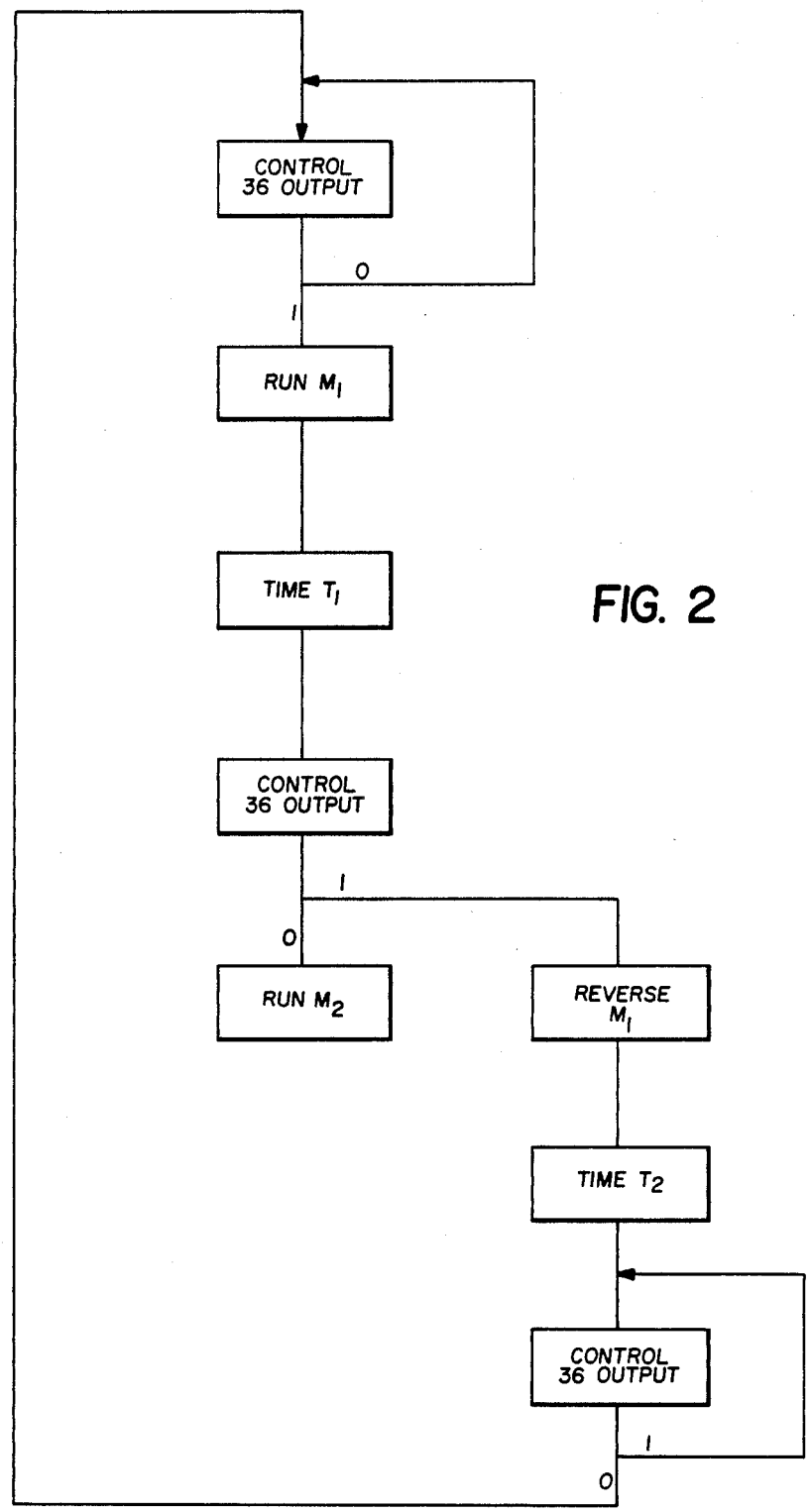
FIG. 2 is a flow diagram illustrating the sequence of functions in the operation of the film handling means.

Referring to FIG. 2, the operation of the system will be described in connection with a flow diagram. If its is assumed that the output of control 36 is binary 0 when no film is present, logic circuit 42 will not energize either amplifier in that state. If the output of the control now becomes binary 1, the logic means will conclude that a film is being inserted. Accordingly, amplifier 44 will be energized to activate motor $M_1$ in a forward direction to cause belt 14 to transport the film into the receiving means.

After a predetermined time interval $T_1$ sufficient to load a four frame film strip into the receiving means, the logic means will energize amplifier 46 to activate motor $M_2$ to close door 20 if the output of control 36 has returned to binary 0 indicating that the film is totally contained within the receiving means. However, if the output of control 36 remains binary 1 after the predetermined time interval, logic means 42 will assume that a film strip of abnormal length was inserted and will energize amplifier 44 to reverse motor $M_1$ and cause the film strip to be ejected without closure of the door. The logic means 42 will cause motor $M_1$ to run in a reverse mode for time $T_2$. At the end of this time interval, the control 36 output will be again monitored. If the output is a binary 0, the logic means will assume that the film has been ejected and removed, and the system will condition itself for processing the next film strip. If the output of control 36 is a binary 1 indiating that a film strip is still in the detection area, then the logic means 42 will keep looking at the output of control 36 until the film strip is removed. Suitable indicating means can be provided to notify the user of the reason for ejection.

While the invention has been described with reference to a preferred embodiment, it will be obvious that various modifications may be reflected without departing from the scope of the invention.

I claim:

1. Apparatus for receiving and handling a film strip having a predetermined maximum length, said apparatus comprising:
   means defining a space for receiving the film strip;
   film transport means actuatable for moving the film strip into said space;
   means for detecting the insertion of the end of the film strip into said space and for indicating the presence of a film strip of abnormal length in said space; and
   means for actuating said transport means to move the film strip into said space in response to detection of insertion of the end of said film strip into said space.

2. Apparatus as claimed in claim 1 wherein said detection means comprises a light source on one side of the film which emits light having a wavelength in the range of 420-600 nanometers and a light sensitive means on the other side of the film for receiving said light when a film strip is not present.

3. Apparatus as claimed in claim 1 wherein said detection means is positioned adjacent to said space but exteriorly thereof whereby said detection means will detect the trailing end of said film strip if the film strip is not totally contained by said space.

4. Apparatus as claimed in claim 2 further including an enclosure for the end of said space including a door moveable to a closed position to prevent light from entering said space.

5. Apparatus as claimed in claim 4 further including means for moving said door to its closed position wherein the presence of said trailing end is not detected by said detecting means.

6. Apparatus as claimed in claim 5 further including means for ejecting said film strip from said space if said detection means detects that the film strip is not totally contained by said space.

7. Apparatus as claimed in claim 6 wherein said detecting means comprises a light source and a light sensing device positioned opposite sides of the slot entrance, said light source emitting light having a wavelength in the range of 420-600 nanometers.

8. A method of handling a film strip which includes the steps of:
   inserting the leading end of the film strip into a film strip receiving space;
   detecting the presence of the leading end adjacent the space;
   actuating a transparent means to move the film strip into the space in response to detection of the leading end of the film strip;
   detecting the presence or absence of the trailing end extending from the space after the film strip has been moved into the space; and
   closing a light blocking door if a trailing end is not detected.

9. A method as claimed in claim 8 further including the step of; and
   ejecting the film strip from the space if a trailing end is detected.

* * * * *